United States Patent Office 3,749,727
Patented July 31, 1973

1

3,749,727
BENZOXANTHENE DYESTUFFS AND PROCESS
FOR THEIR MANUFACTURE
Otto Fuchs and Helmut Troster, Frankfurt am Main,
Germany, assignors to Farbwerke Hoechst Aktiengesellschaft vormals Meister Lucius & Bruning, Frankfurt am Main, Germany
No Drawing. Filed Feb. 22, 1971, Ser. No. 117,713
Claims priority, application Germany, Feb. 24, 1970,
P 20 08 491.7
Int. Cl. C07d *39/00*
U.S. Cl. 260—281                     7 Claims

ABSTRACT OF THE DISCLOSURE

Benzoxanthene dyestuffs of the formula

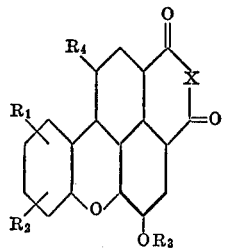

wherein X is hydrogen or a —N—R group, in which R is hydrogen, cycloalkyl, pyridyl, hydroxy, amino, aryl or substituted or unsubstituted alkyl, $R_1$ and $R_2$ are hydrogen, halogen, alkyl, alkoxy, aryl, carbalkoxy or cyano, $R_3$ is an alkyl group, which may be substituted and $R_4$ is hydrogen, nitro or an alkoxy group, which may be substituted. The dyestuffs, which have good fastness properties with respect to wet processing, thermofixation and light, can be used for the dyeing of synthetic polymers in the mass and for the dyeing of synthetic fibrous materials, such as polyethylene-glycol-terephthalate, polyamides or acetyl cellulose. Moreover, due to their fluorescence, they can be used for the preparation of daylight-fluorescent paints and coatings.

---

The present invention relates to new, valuable benzoxanthene dyestuffs of the general formula

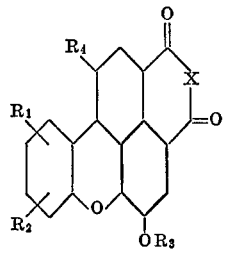

in which X represents an oxygen atom or a >N—N group, in which R stands for a hydrogen atom or an optionally substituted alkyl, cyclo-alkyl or aryl group, a heterocyclic group, a hydroxy or amino group, $R_1$ and $R_2$ each represent a hydrogen or halogen atom or an alkyl, alkoxy, aryl, carbalkoxy or nitrile group, $R_3$ is an optionally substituted alkyl group and $R_4$ stands for a hydrogen atom, an optionally substituted alkoxy group or a nitro group. The present invention also provides a process for the manufacture of said benzoxanthene dyestuffs, which comprises (a) heating the diazonium salts of 4-(2'-aminophenoxy)-naphthalic acid derivatives of the general formula

2

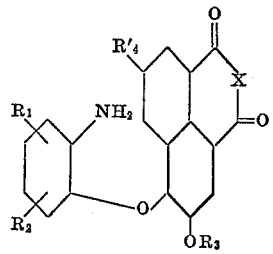

in the presence of copper or copper salts and, of the so obtained dyestuffs of the general formula

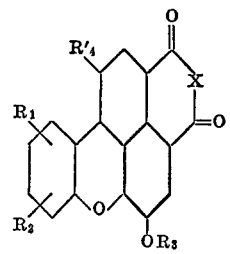

X, $R_1$, $R_2$ and $R_3$ of the cited Formulae 2 and 3 being as defined above and $R'_4$ representing a hydrogen atom or an optionally substituted alkoxy group, (b) optionally nitrating those dyestuffs in which $R'_4$ represents a hydrogen atom, and, of the dyestuffs obtained according to (a) and (b) and having the general formula

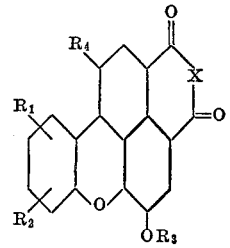

in which X, $R_1$, $R_2$, $R_3$ and $R_4$ are as defined above, (c) optionally condensing those dyestuffs in which X represents an oxygen atom, with compounds of the general formula $$R\text{—}NH_2 \qquad (5)$$

in which R is as defined above.

In the case where R of the >N—R group of the cited formulae stands for an alkyl radical, this radical is advantageously a straight-chain or branched alkyl radical having from 1 to 20 carbon atoms. Examples are the methyl, ethyl, n-propyl, i-propyl, n-butyl, i-butyl, octyl, dodecyl, stearyl or eicosyl radical. These alkyl groups may additionally be substituted at choice, for example by hydroxy groups, alkoxy groups, advantageously having from 1 to 8 carbon atoms, alkoxy-alkoxy groups each having from 1 to 8 carbon atoms, N-dialkylamino groups advantageously having from 1 to 4 carbon atoms in the alkyl groups, acyloxy groups, especially the acetoxy, propionyloxy and benzoyloxy group, cyclo-alkoxy groups, especially the cyclo-hexoxy group, carboxylic acid groups, carboxylic acid amide groups and carboxylic acid ester groups, especially carboxylic acid alkyl ester groups having from 1 to 4 carbon atoms in the alkyl radical. These alkyl groups may further be substituted by phenyl radicals which, for their part, may also be substituted, for especially by lower alkyl or alkoxy groups or halogen atoms, especially chlorine or bromine atoms. These alkyl radicals may contain one or two of the aforementioned substituents. The radical R may further be a cyclo-alkyl radical, especially a cyclohexyl radical or a heterocyclic radical, for example a pyridyl radical. Examples of R being an aryl radical are especially the phenyl and naphthyl radical which may contain further substituents, advantageously from 1 to 3 substituents. Examples of such substituents are above all alkyl and alkoxy groups having from 1 to 4 carbon atoms, sulfonamide, carbonamide, amino and hydroxy groups as well as halogen atoms, especially chlorine and bromine atoms.

In the case where $R_1$ and $R_2$ of the cited formulae are halogen atoms, they are above all chlorine or bromine atoms. The alkyl and alkoxy groups having the signification of $R_1$ and $R_2$ are advantageously those having from 1 to 4 carbon atoms. When $R_1$ and $R_2$ are aryl radicals, they are preferably phenyl radicals, which optionally may be substituted additionally. Examples of carbalkoxy groups ($R_1$ and $R_2$) are above all the carbomethoxy and carbo-ethoxy group.

The radical $R_3$ is an alkyl group advantageously having from 1 to 4 carbon atoms, which may be substituted additionally by halogen atoms, preferably chlorine or bromine atoms, hydroxy groups, alkoxy groups having from 1 to 4 carbon atoms, aryloxy groups, for example the phenoxy group, aryl radicals, for example the phenyl radical, or by acyloxy groups, especially the acetoxy, propionyloxy or benzoyloxy group.

In the case where the radical $R_4$ is an alkoxy group, it is advantageously an alkoxy group having from 1 to 4 carbon atoms, which additionally may be substituted. Examples of such substituents are hydroxy groups, halogen atoms, especially chlorine or bromine atoms, nitrile groups, optionally substituted phenyl radicals and acyloxy groups, for example the acetoxy, propionyloxy and benzoyloxy group.

The ring closure according to (a) may be carried out in various ways. The diazo solution or suspension acidified by acetic or mineral acid may either be fed in a boiling aqueous, neutral, acidic or even alkaline copper salt solution or mixed with a copper salt solution and then be heated, or copper powder is stirred into the diazo solution and the whole is subsequently heated until the evolution of nitrogen has come to an end. The ring closure is advantageously carried out at temperatures between about 70° and 110° C.

The dyestuff obtainable according to this method may be isolated in known manner. The optional nitration of the 6-alkoxy-benzoxanthene-3,4-dicarboxylic acid imides or 6-alkoxy-benzoxanthene - 3,4 - dicarboxylic acid anhydrides according to the process of the invention (b) is advantageously carried out as follows: the cited substances are suspended or dissolved in organic solvents, for example glacial acetic acid, acetic anhydride, chloroform, carbon tetrachloride, ethylene chloride, o-dichlorobenzene, nitrobenzene or dimethylformamide, and at least the equimolar amount of nitric acid, preferably having a density of from $d=1.4$ to $d=1.5$, optionally after dilution with one of the above solvents, is added dropwise to this suspension or solution. The reaction temperature may widely vary, depending on the solvent used. Advantageously, the nitration is carried out at a temperature of from 15° to 80° C.

The dyestuff obtained by nitration according to the process of the invention may be isolated directly or after dilution with a low-boiling solvent which causes precipitation of the dyestuff, for example methanol. In some cases, it is advantageous to eliminate the solvent from the reaction mixture, for example by steam distillation, in order to separate the dyestuff.

The condensation of the benzoxanthene-3,4-dicarboxylic acid anhydrides of Formula 4 ($X=O$) obtained according to (a) and (b) with the amines of Formula 5 according to (c) may be carried out in known manner.

Advantageously, the substituted benzoxanthene-3,4-dicarboxylic acid anhydrides are heated for a longer period, optionally under pressure, with excess amine in water or in an inert organic solvent, for example methanol, ethanol, isopropanol, an ethylene-glycolmonoalkyl ether or dimethylformamide. The dyestuffs obtained separate from the reaction mixture and may be isolated in known manner.

Besides ammonia, hydroxylamine and hydrazines, as amines for the condensation with the benzoxanthene-3,4-dicarboxylic anhydrides the following substances may be used: aliphatic, cyclo-aliphatic, aromatic, araliphatic and heterocyclic amines, for example methylamine, ethylamine, butylamine, octylamine, dodecylamine, stearylamine, isopropylamine, ethanolamine or isopropanolamine, acetoxy-ethylamine or acetoxypropylamine, methoxyethyl-methoxypropyl-, methoxybutyl- or butoxypropylamine, isopropoxy-propylamine, methoxy-ethoxy-propylamine, cyclohexoxy-propylamine, aminoacetic acid, aminobutyric acid, aminobutyric acid amide, 2-phenyl-ethylamine, N-dialkylaminoethylamines, cyclohexylamine, aniline, chloranilines, anisidines, toluidines, xylidines, metanilic acid amide, aminobenzoic acid amides, cyclohexyl aniline and aminopyridine.

The amines may be used alone or in the form of their mixtures; the mixture ratio of the amine components may be freely chosen.

The 4 - (2' - aminophenoxy)-naphthalic acid anhydrides or imides may be prepared in known manner by condensing for example 4-bromo- or 4-chloronaphthalic acid anhydrides or imides which are substituted in 3-position by an optionally substituted alkoxy group, and which may contain an optionally substituted alkoxy group in 6-position, with unsubstituted or correspondingly substituted o-nitrophenols in acid dialkylamines, for example dimethylformamide, dimethylacetamide, N-methylpyrrolidone or hexamethyl-phosphoric acid triamide, in the presence of basically reacting substances, and subsequently reducing the nitro group to the amino group.

The new valuable dyestuffs obtainable according to the process of the invention are especially suitable for the dyeing of synthetic materials, for example polyethyleneglycol terephthalate, polyamides or acetyl cellulose. They yield brilliant yellow to orange-red dyeings which are distinguished by excellent fastnesses to wet processing and to thermofixation, and partly by excellent fastnesses to light. On account of their fluorescence, numerous products of the process of the invention are highly suitable as fluorescing dyestuffs for the dyeing of synthetic polymers, such as polystyrene, polyvinyl chloride, polymethacrylate, polyethylene and polypropylene in the mass, as well as for the preparation of daylight-fluorescent paints and coatings. Yellow to yellow-red dyeings are then obtained which fluoresce in a yellow to orange-yellow colour and which are distinguished by their high thermostability and partly by a very good fastness to light.

Further, the dyestuffs are also suitable for the dyeing of synthetic fibre-forming polymers, for example polyethyleneglycol terephthalate or polyamides, in the mass as well as, on account of their partly good solubility in organic solvents, for the tinting of lacquers, varnishes and oils.

Mixtures of 2 or 3 of the benzoxanthene dyestuffs of the invention, in which the single component dyestuffs differ as to the radical X, especially as to the >N—R— group, show generally a still better affinity as the single dyestuffs when applied from an aqueous medium on synthetic materials, above all on polyethylene-glycol terephthalate.

The following examples illustrate the invention.

EXAMPLE 1

24.4 g. of 3-methoxy-4-(2'-aminophenoxy)-naphthalic acid-N-γ-methoxypropylimide are suspended in a mixture of 110 g. of glacial acetic acid and 110 g. of water, and converted to the hydrochloride by adding 14.1 g. of concentrated hydrochloric acid. Subsequently, diazotization is carried out at 0° to 5° C. with 11.2 g. of 40% sodium nitrite solution. The diazo solution is clarified and added dropwise to a boiling solution of 25 g. of crystalline copper sulfate in 375 g. of water and 45 g. of glacial acetic acid. After the nitrogen evolution has come to an end, the precipitated dyestuff is suction-filtered, washed with water and dried. It crystallizes from methyl-glycol in the form of luminous orange-yellow lamellae.

*Analysis.*—Calc. (percent): C, 71.0; H, 4.9; N, 3.6. Found (percent): C, 70.9; H, 5.1; N, 3.9.

The dyestuff of the formula

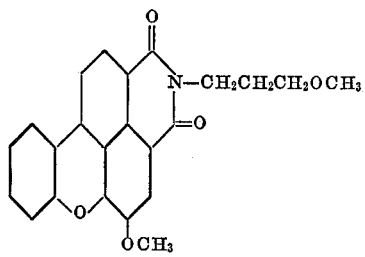

obtained dyes polyester fibres brilliant golden yellow shades of excellent fastnesses to light, to wet processing and to thermofixation.

EXAMPLE 2

A mixture of 22.1 g. of 3($\beta$-hydroxy-ethoxy)-4-(2'-amino-5'-chlorophenoxy) - naphthalic acid-N-$\beta$-hydroxy-ethylimide, 100 g. of glacial acetic acid, 120 g. of water and 12.0 g. of concentrated hydrochloric acid is diazotized at 0° to 5° C. in known manner, and the diazo mixture is stirred into a boiling solution of 30 g. of crystalline copper sulfate in 450 g. of 10% acetic acid. After normal work-up, the dyestuff of the formula

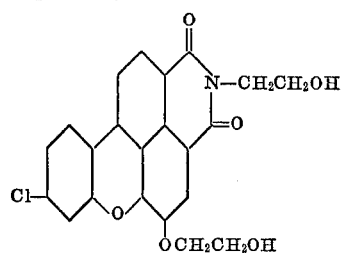

is obtained which yields yellow dyeings on polyester materials.

EXAMPLE 3

(a) At 0° to 5° C., 29.7 g. of 40% sodium nitrite solution are fed into a mixture of 55.0 g. of 3-methoxy-4-(2'-aminophenoxy)-naphthalic anhydride, 392 g. of glacial acetic acid and 38.1 g. of concentrated hydrochloric acid. The yellow-brown diazo solution so obtained is added dropwise to a 90° C. hot solution of 58.3 g. of crystalline copper sulfate in 1100 g. of 15% acetic acid within a period of 1 to 2 hours. The orange-yellow reaction product precipitated by this operation is isolated in known manner. The compound of the formula

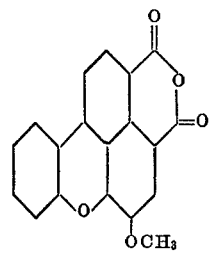

crystallizes from dimethylsulfoxide in the form of luminous orange-yellow lamellae.

*Analysis.*—Calcd. (percent): C, 71.6; H, 3.2. Found (percent): C, 71.0; H, 3.1.

On polyester fabrics, this compound yields brilliant yellow dyeings having very good fastnesses. When instead of 3-methoxy-4-(2'-aminophenoxy)-naphthalic anhydride equivalent amounts of 3-methoxy-4-(2'-amino-4'-bromophenoxy)-, 3-methoxy-4-(2'-amino - 5' - chlorophenoxy)-, 3-methoxy-4-(2'-amino-4'-chloro - 5' - methylphenoxy)-, 3-methoxy-4-(2'-amino-4'-methylphenoxy)-, 3-methoxy-4-(2'-amino - 5' - methylphenoxy)- or 3-methoxy-4-(2'-amino-5'-methoxy-phenoxy) - naphthalic anhydride are used, dyestuffs are obtained which yield dyeings having similar properties.

(b) 6.4 g. of the dicarboxylic acid anhydride obtained according to (a) are stirred for 8 hours in an autoclave with 2.7 g. of isopropanolamine in 110 ml. of water. The dyestuff of the formula

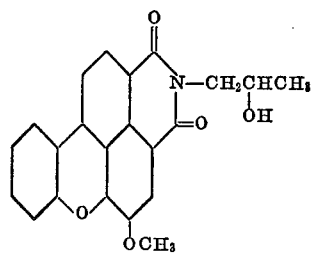

isolated in known manner, dyes polyester materials luminous golden yellow shades having excellent fastnesses to light and to thermofixation.

(c) A melt of 12.0 g. of the 6-methoxy-benzoxanthene-3,4-dicarboxylic acid anhydride obtained according to (a) and 80 g. of 2-aminopyridine is maintained at 170° to 180° C. for 5 hours. Subsequently, the reaction mixture is diluted at 70° to 80° C. with 180 g. of methanol, and the precipitated dyestuff of the formula

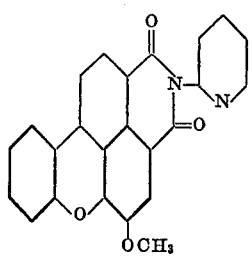

is filtered off. Used in polystyrene and polyvinyl chloride, yellow dyeings fluorescing in a yellow-green shade are obtained.

EXAMPLE 4

(a) 14.6 g. of 3-methoxy-4-(2'-amino-4'-methoxyphenoxy)-naphthalic anhydride in a mixture of 97.0 g. of glacial acetic acid and 38.9 g. of water are converted to the hydrochloride by adding 9.5 g. of concentrated hydrochloric acid, and diazotized in known manner with 7.3 g. of 40% sodium nitrite solution. The brown diazo solution is clarified and subsequently treated with 300 g. of a boiling 8% copper sulfate solution. The orange dyestuff of the formula

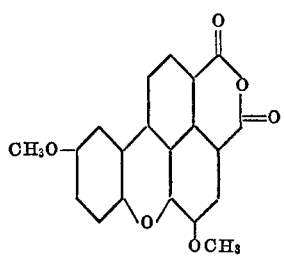

so obtained, which crystallizes from dimethylformamide in orange coloured little needles, yields orange-yellow dyeings having good general fastnesses when used according to the normal methods of polyester mass dyeing.

Calcd. (percent): C, 68.9; H, 3.5. Found (percent): C, 68.7; H, 3.5.

(b) 34.8 g. of the 6,10-dimethoxyxanthene-3,4-dicarboxylic acid anhydride obtained according to (a) are kept boiling for 5 hours together with a mixture of 3.2 g. of ethanolamine and 4.0 g. of isopropanolamine in 320 ml. of methylglycol. After the condensation is complete, the crystallized dyestuff mixture is suction-filtered. On polyester materials, it yields brilliant orange-yellow dyeings which are distinguished by excellent fastnesses to light, to wet processing and to thermofixation, as well as by a very good colour build-up.

(c) 34.8 g. of the anhydride obtained according to (a) are introduced in portions at 140° to 150° C. in a melt of 60 g. of stearylamine, and the mixture is maintained for a further 3 hours at 140° to 150° C. Subsequently, the reaction mixture is diluted at 130° C. with 280 g. of butyl acetate, stirred for a short time at 100° C., and the dyestuff of the formula

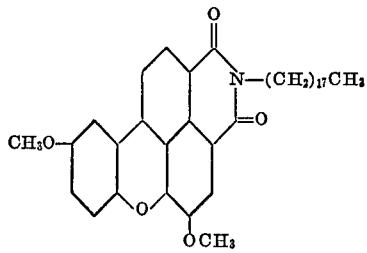

obtained is isolated in known manner. This dyestuff dyes polystyrene and polymethacrylate objects orange-yellow shades which fluoresce in an intense yellow-green colour and show a very good fastness to light.

EXAMPLE 5

(a) 15.2 g. of 3,6-dimethoxy-4-(2'-amino-5'-methylphenoxy)-naphthalic anhydride are diazotized and closed to a ring according to Example 4(a). The anhydride of the formula

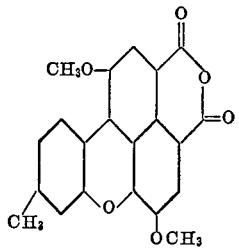

is obtained which, after recrystallization from dimethylformamide, dyes polyester materials clear, orange shades having good fastnesses.

(b) A mixture of 7.2 g. of the 1,6-dimethoxy-9-methylbenzoxanthene3,4-dicarboxylic acid anhydride and 4.2 g. of aminoacetic acid in 90 ml. of dimethylformamide is kept boiling for 5 hours. The crystallized orange-yellow dyestuff of the formula

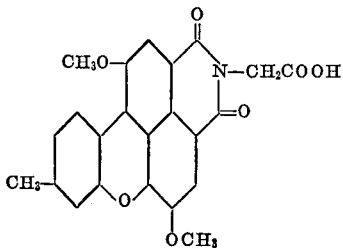

is highly appropriate for the dyeing of polyethyleneglycol terephthalate in the mass. Orange-yellow dyeings fast to thermofixation are obtained.

EXAMPLE 6

19.4 g. of the 6-methoxy-benzoxanthene-3,4-dicarboxylic acid-N-γ-methoxy-propylimide obtained according to Example 1 are suspended in a mixture of 300 ml. of glacial acetic acid and 50 ml. of acetic acid anhydride. Subsequently, a solution of 8.5 g. of nitric acid ($d$=1.5) in 25 ml. of glacial acetic acid is slowly added dropwise at 20° to 25° C. The starting compound partly dissolves and, after a short time, the reaction product begins to crystallize. The dyestuff obtained is suction-filtered after 3 hours, washed with methanol and recrystallized from methyl-glycol for purification. The compound of the formula

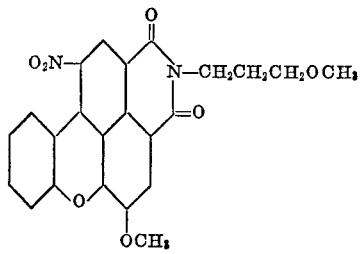

is obtained in the form of a luminous orange felt of needles.

*Analysis.*—Calc. (percent): C, 63.5; H, 4.1; N, 6.4. Found (percent): C, 63.5; H, 4.2; N, 6.3.

The dyestuff dyes polyester materals clear orange shades.

EXAMPLE 7

(a) 3.5 g. of nitric acid ($d$=1.5), dissolved in 20 g. of ethylene chloride, are added dropwise, at boiling temperature, to a mixture of 13.9 g. of the 6,10-dimethoxy-benzoxanthene-3,4-dicarboxylic acid anhydride obtained according to Example 4(a) in 350 g. of ethylene chloride. After the addition of the nitric acid, the whole is kept boiling for a further 30 minutes, then the batch is diluted with 200 ml. of 8% potassium hydroxide solution, and the ethylene chloride is eliminated from the reaction mixture. The dyestuff of the formula

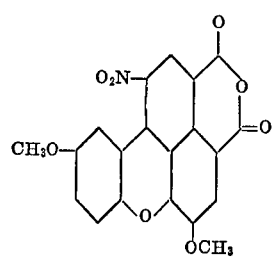

is precipitated from the still hot, deeply orange-red alkaline solution by acidification with glacial acetic acid. The dyestuff dyes polyethylene-glycol terephthalate clear orange-red shades.

(b) 7.8 g. of the anhydride obtained according to (a) in 150 ml. of methylglycol are refluxed for 4 hours with 2.0 g. of ethanolamine. The dyestuff of the formula

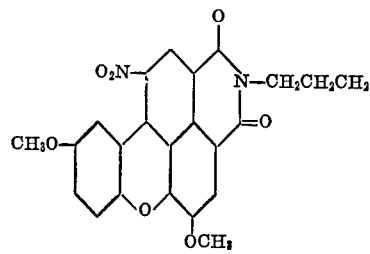

obtained is isolated in known manner. On fibrous materials made from polyethylene-glycol terephthalate, orange-red dyeings having an excellent fastness to thermofixation are obtained.

EXAMPLE 8

A solution of 2.3 g. of nitric acid ($d=1.5$) in 8 g. of nitrobenzene is added dropwise to a mixture of 7.2 g. of 6-ethoxy-9-methyl-benzoxanthene-3,4 - dicarboxylic acid-N-methylimide. After 3 hours, the whole is diluted with 150 g. of methanol and worked up in known manner. This dyestuff of the formula

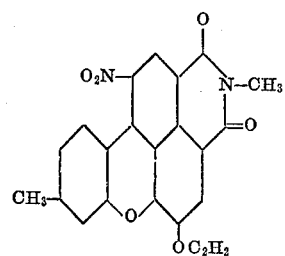

yields clear orange dyeings on polyester fibres.

Further yellow to orange-red dyestuffs are listed in the following table, which are obtainable according to the methods described in the above examples and which correspond to the following formula

TABLE

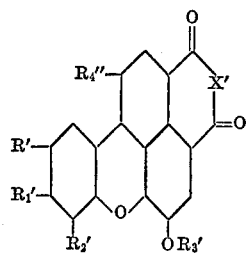

| Example | X' | R' | $R_1'$ | $R_2'$ | $R_3'$ | $R_4''$ |
|---|---|---|---|---|---|---|
| 9 | O | $OCH_3$ | H | H | $CH_2CH_2OCOCH_3$ | H |
| 10 | O | $CH_3$ | $CH_3$ | H | $CH_2C_6H_5$ | H |
| 11 | O | H | Br | H | $C_2H_5$ | $OC_2H_5$ |
| 12 | O | H | H | $CH_3$ | $CH_2CH_2OH$ | $OCH_2CH_2OH$ |
| 13 | O | $CH_3$ | Cl | H | $CH_2CH_2OH$ | $NO_2$ |
| 14 | O | Cl | H | H | $C_2H_5$ | $NO_2$ |
| 15 | $NCH_2CH_2CH_2OCH_3$ | H | H | H | $CH_2C_6H_5$ | $NO_2$ |
| 16 | N—⟨⟩—CH₃ (with CH₃) | H | H | H | $CH_3$ | $NO_2$ |
| 17 | N—⟨⟩—Cl | $OCH_3$ | H | H | $C_2H_5$ | $NO_2$ |
| 18 | N—⟨⟩—$OCH_3$ | H | $CH_3$ | H | $CH_3$ | $NO_2$ |
| 19 | N—$(CH_2)_3OH$ | H | $CH_3$ | H | $CH_3$ | H |
| 20 | N—$(CH_2)_3CONH_2$ | H | H | H | $CH_3$ | H |
| 21 | N—$(CH_2)_3O(CH_2)_2OCH_3$ | $OCH_3$ | H | H | $C_2H_5$ | H |
| 22 | N—$NH_2$ | $OCH_3$ | H | H | $CH_3$ | H |
| 23 | N—$NH_2$ | $OCH_3$ | H | H | $CH_3$ | $OCH_3$ |
| 24 | N—$NH_2$ | H | H | H | $CH_3$ | H |
| 25 | N—$NH_2$ | H | H | H | $CH_3$ | $OCH_3$ |
| 26 | N—⟨⟩—$SO_2NH_2$ | H | H | H | $CH_3$ | H |
| 27 | N—⟨⟩—$SO_2NH_2$ | $OCH_3$ | H | H | $CH_3$ | H |
| 28 | N—⟨⟩—$CONH_2$ | $OCH_3$ | H | H | $CH_3$ | $OCH_3$ |
| 29 | N—⟨⟩—$NH_2$ | H | H | H | $CH_3$ | H |
| 30 | N—$CH_2$—⟨⟩ | H | H | H | $C_2H_5$ | $OC_2H_5$ |
| 31 | NH | H | H | H | $CH_3$ | H |
| 32 | NH | $OCH_3$ | H | H | $CH_3$ | H |
| 33 | N—OH | H | H | H | $CH_3$ | H |
| 34 | N—⟨N⟩ (piperidino) | $OCH_3$ | H | H | $CH_3$ | H |
| 35 | N—$CH_2$—$CH_2OCOCH_3$ | H | H | H | $CH_3$ | H |

TABLE—Continued

| Example | X' | R' | R$_1$' | R$_2$' | R$_3$' | R$_4$'' |
|---|---|---|---|---|---|---|
| 36 | N—CH$_2$CHCH$_3$<br>\|<br>OCOCH$_3$ | OCH$_3$ | H | H | CH$_3$ | OCH$_3$ |
| 37 | N—(CH$_2$)$_3$O(CH$_2$)$_3$CH$_3$ | H | OCH$_3$ | H | CH$_3$ | H |
| 38 | N—⟨H⟩ | H | Cl | CH$_3$ | CH$_3$ | H |
| 39 | N—(CH$_2$)$_3$OCH$_3$ | COOCH$_3$ | H | H | CH$_3$ | H |
| 40 | —N(CH$_2$)$_3$OCH$_2$CH(CH$_2$)$_3$CH$_3$<br>\|<br>C$_2$H$_5$ | H | H | H | CH$_3$ | H |
| 41 | N—(CH$_2$)$_{17}$CH$_3$ | CH$_3$ | H | H | CH$_2$CH$_2$OCOCH$_3$ | H |
| 42 | N—CH$_2$CH$_2$OH | OCH$_3$ | H | H | C$_2$H$_5$ | OC$_2$H$_5$ |
| 43 | N—(CH$_2$)$_3$OH | H | H | H | CH$_3$ | H |
| 44 | N—(CH$_2$)$_3$OCOCH$_3$ | H | H | H | CH$_3$ | H |
| 45 | N—(CH$_2$)$_3$N(C$_2$H$_5$)$_2$ | H | CH$_3$ | H | C$_2$H$_5$ | H |
| 46 | N—(CH$_2$)$_3$COOH | H | H | H | CH$_3$ | OCH$_3$ |
| 47 | N—CH$_2$CH$_2$OCOCH$_3$ | H | H | H | CH$_2$CH$_2$OCOCH$_3$ | OCH$_2$CH$_2$OCOCH$_3$ |
| 48 | N—(CH$_2$)$_3$OCH$_3$ | Cl | H | H | CH$_2$C$_6$H$_5$ | CH$_2$C$_6$H$_5$ |

We claim:
1. A dyestuff of the formula

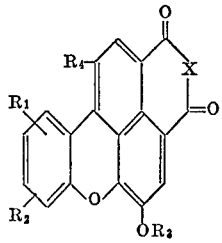

wherein

X is >NR in which R is hydrogen, cyclohexyl, pyridyl-2, hydroxy, amino, phenyl, phenyl substituted by 1 to 3 members of the group lower alkyl, lower alkoxy, chlorine, bromine, sulfonamide, carbonamide, amino and hydroxy, alkyl of 1 to 20 carbon atoms or alkyl of 1 to 20 carbon atoms substituted by 1 or 2 members of the group hydroxy, alkoxy of 1 to 8 carbon atoms, alkoxyalkoxy of 1 to 8 carbon atoms, 6-di-lower alkylamino, lower alkanoyloxy, cyclohexoxy, carboxylic acid, carboxylic acid amide, carboxylic acid ester, phenyl, lower alkyl-phenyl, lower alkoxy-phenyl, chloro-phenyl, and bromophenyl;

R$_1$ and R$_2$ each is hydrogen, chlorine, bromine, lower alkyl, lower alkoxy, phenyl, lower carbalkoxy or cyano;

R$_3$ is lower alkyl, chloro-lower alkyl, bromo-lower alkyl, hydroxy-lower alkyl, lower alkoxy-lower alkyl, phenoxy-lower alkyl, phenyl-lower alkyl or lower alkanoyloxy-lower alkyl; and R$_4$ is hydrogen, nitro, alkoxy or alkoxy substituted by hydroxy, chlorine, bromine, cyano, phenyl or lower alkanoyloxy;

provided that lower means 1 to 4 carbon atoms.

2. A dyestuff according to claim 1 wherein R is amino, hydroxy lower alkyl or lower alkoxy-lower alkyl, R$_3$ is lower alkyl, and R$_4$ is hydrogen or lower alkoxy.

3. The dyestuff of the formula

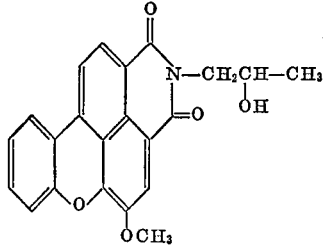

4. The dyestuff of the formula

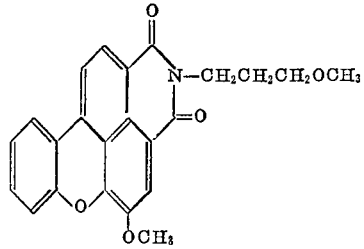

5. The dyestuff of the formula

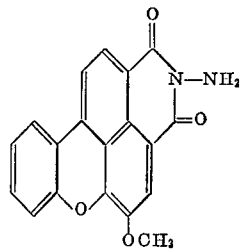

6. The dyestuff of the formula

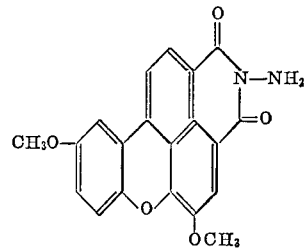

7. The dyestuff of the formula

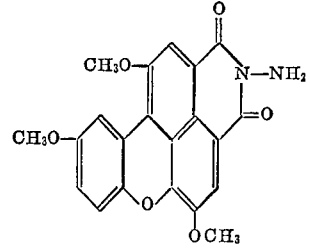

(References on following page)

References Cited

UNITED STATES PATENTS

| | | | |
|---|---|---|---|
| 3,330,834 | 7/1967 | Senshu | 260—281 |
| 3,350,985 | 12/1967 | Fuchs et al. | 260—281 |
| 3,367,937 | 2/1968 | Fuchs et al. | 260—281 |
| 3,502,678 | 3/1970 | Fuchs et al. | 260—281 |

DONALD G. DAUS, Primary Examiner

U.S. Cl. X.R.

8—178, 179; 260—144, 343.5